US007753333B2

(12) United States Patent
Kubota

(10) Patent No.: US 7,753,333 B2
(45) Date of Patent: Jul. 13, 2010

(54) ENGAGEMENT MEMBER FOR DISPLAY DEVICE

(75) Inventor: Harunobu Kubota, Ichikawa (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 137 days.

(21) Appl. No.: 11/794,062

(22) PCT Filed: Dec. 13, 2005

(86) PCT No.: PCT/JP2005/022813

§ 371 (c)(1),
(2), (4) Date: Jun. 22, 2007

(87) PCT Pub. No.: WO2006/067998

PCT Pub. Date: Jun. 29, 2006

(65) Prior Publication Data

US 2008/0100999 A1 May 1, 2008

(30) Foreign Application Priority Data

Dec. 22, 2004 (JP) ............................. 2004-370427

(51) Int. Cl.
*F16B 45/00* (2006.01)

(52) U.S. Cl. ..................... 248/304; 211/94.01; 52/36.4; 52/36.5

(58) Field of Classification Search .............. 248/221.2, 248/222.2, 231.3, 222.51, 304; 211/87, 59.1, 211/57.1, 94.01; 411/48, 45; 52/36.5, 36.4
See application file for complete search history.

(56) References Cited

U.S. PATENT DOCUMENTS 5,125,518 A * 6/1992 Ward ........................ 211/87.01
5,407,160 A * 4/1995 Hollingsworth et al. ..................... 248/220.43
5,582,376 A 12/1996 Thompson
5,881,982 A * 3/1999 Hollingsworth et al. ..................... 248/220.31
5,941,026 A * 8/1999 Eisenreich et al. ........... 52/36.5
6,134,846 A * 10/2000 Lamb ......................... 52/36.5
7,086,542 B2 * 8/2006 Tomonari et al. ........ 211/94.01
7,252,274 B1 * 8/2007 Brannen ..................... 248/301

(Continued)

FOREIGN PATENT DOCUMENTS

JP 45-16142 7/1970

(Continued)

OTHER PUBLICATIONS

International Search Report for PCT/JP2005/022813 mailed Mar. 28, 2006 w/ English translation (2 pages).

(Continued)

*Primary Examiner*—J. Allen Shriver
*Assistant Examiner*—Todd M. Epps
(74) *Attorney, Agent, or Firm*—Osha • Liang LLP

(57) ABSTRACT

In an engagement member 2 comprising a main body part 3 and an engagement part 4, the main body part 3 is separately formed from the engagement part 4A. A screw passage hole 3*c* is formed in the main body part 3. A screw hole 4*a* is formed in the engagement part 4. By tightening a screw member 6 passed through the screw passage hole 3*c* and threadingly engaged with the screw hole 4*a*, the engagement part 4 is removably attached to the main body part 3.

2 Claims, 6 Drawing Sheets

U.S. PATENT DOCUMENTS

| | | | |
|---|---|---|---|
| 2004/0149669 A1 | 8/2004 | Tomonari et al. | |

FOREIGN PATENT DOCUMENTS

| | | |
|---|---|---|
| JP | 60-97064 | 7/1985 |
| JP | 1-81964 | 6/1989 |
| JP | H01-081964 | 6/1989 |
| JP | 7-255573 | 10/1995 |
| JP | 2004-230084 | 8/2004 |

OTHER PUBLICATIONS

Patent Abstracts of Japan 2004-230084 dated Aug. 19, 2004 (1 page).

Office Action in Chinese Patent Application No. 2005800437987, dated Jun. 5, 2009 (5 pages).

Concise Explanation of Relevance of Japanese Utility Model Application Laid-Open No. H01-081964 (1 page).

Japanese Office Action for Application No. 2004-370427, mailed on Apr. 13, 2010 (4 pages).

* cited by examiner

ENGAGEMENT MEMBER FOR DISPLAY DEVICE

TECHNICAL FIELD

This invention relates to an engagement member used in a display device for displaying various merchandise items such as clothes, and other items.

BACKGROUND ART

In general, a display device includes a panel (base material) fixed to a vertical wall surface and an engagement member removably attached to a front surface of this panel. A plurality of engagement parts are formed on the front surface of the panel in a vertical relation with a predetermined space. The engagement member includes a main body part and an engagement part disposed at the main body part. The engagement part is removably engaged with selected one of the engagement parts. Owing to the foregoing arrangement, the engagement member is removably connected to the panel at a desired position (see Patent Documents 1 through 3).

Patent Document 1: Japanese Utility Model Application Laid-Open No. S60-97064

Patent Document 2: Japanese Patent Application Laid-Open No. H07-55573

Patent Document 3: Japanese Patent Application Laid-Open No. 2004-230084

DISCLOSURE OF THE INVENTION

Problem to be Solved by the Invention

The main body part of the engagement member has a variety of lengths depending on for what purpose the engagement member is to be used. Therefore, it is necessary to manufacture engagement members as many kinds as corresponding to the number of main body parts each having a different length and thus, the manufacturing cost is increased.

Means for Solving the Problem

In order to solve the above-mentioned problem, according to a first mode of the present invention, there is provided an engagement member for a display device comprising a main body part having a predetermined length in a vertical direction and an engagement part disposed at the main body part and removably engaged with a front surface part of a base material, characterized in that the engagement part is separately formed from the main body part and removably attached to the main body part.

In order to solve the above-mentioned problem, according to a second mode of the present invention, there is provided an engagement member for a display device comprising a main body part having a predetermined length in a vertical direction and two engagement parts mutually separately disposed at the main body part in a vertical direction and removably engaged with a front surface part of the base material, characterized in that at least one of the two engagement parts is separately formed from the main body part and removably attached to the main body part.

The main body part is preferably provided with an abutment part which is, when the engagement part attached to the main body part is removed from the base material, abutted with the base material, thereby the engagement part is prohibited from escaping from the base material.

EFFECT OF THE INVENTION

In order to manufacture engagement members whose main body parts have a different length for each, main body parts each having a different length are manufactured and then, engagement members are simply attached to the respective main body parts. That is, with respect to the main body parts, it is necessary to manufacture main body parts each having a different length as many as corresponding to different lengths of the engagement members. However, with respect to the engagement members, they are not required to be manufactured as many kinds as corresponding to the main body parts each having a different length but only one kind of engagement members are good enough to be manufactured. Therefore, the manufacturing cost of the engagement members can be reduced.

DESCRIPTION OF REFERENCE NUMERAL

A, A', B, C, C', D . . . display device
1 . . . panel (base material)
2, 2', 2B, 2C, 2D . . . engagement member
3, 3', 3B, 3C, 3D . . . main body part
3*d* . . . abutment part
4 . . . engagement part
7 . . . integral engagement part (engagement part)

BEST MODE FOR CARRYING OUT THE INVENTION

The best mode for carrying out the present invention will be described hereinafter with reference to the drawings.

Figure 1:
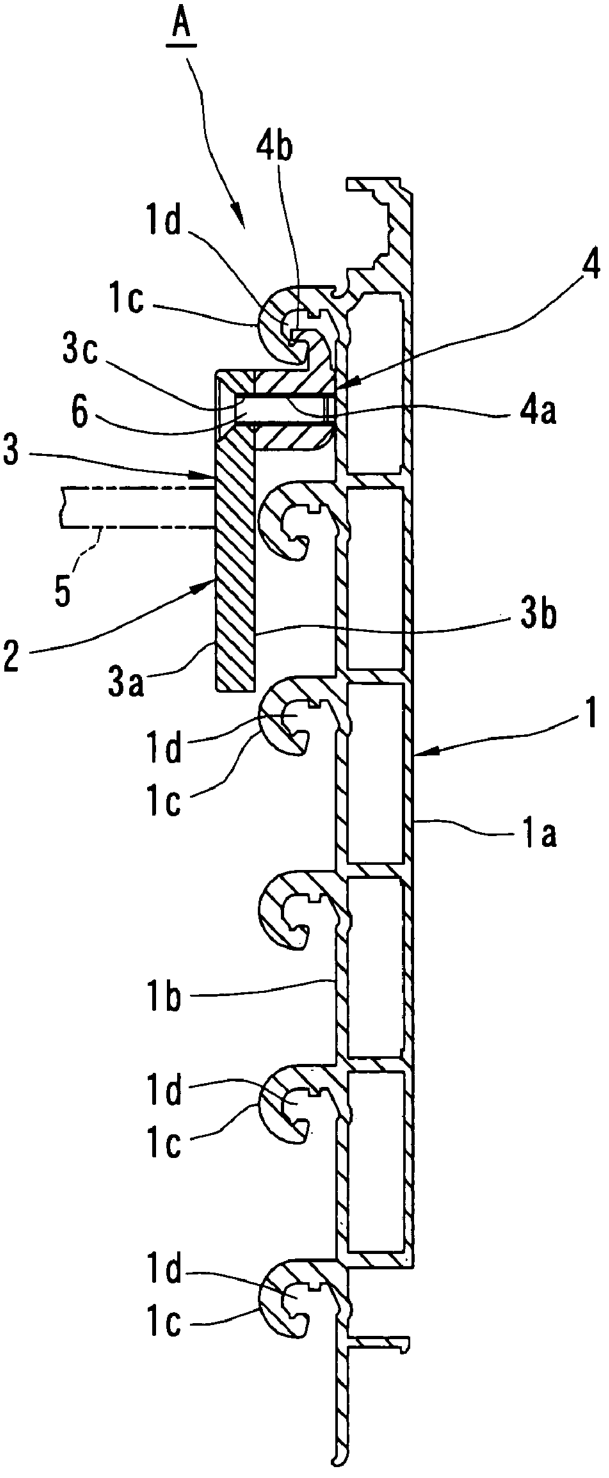
FIG. 1 is a vertical sectional side view showing a first embodiment of the present invention.
Figure 2:
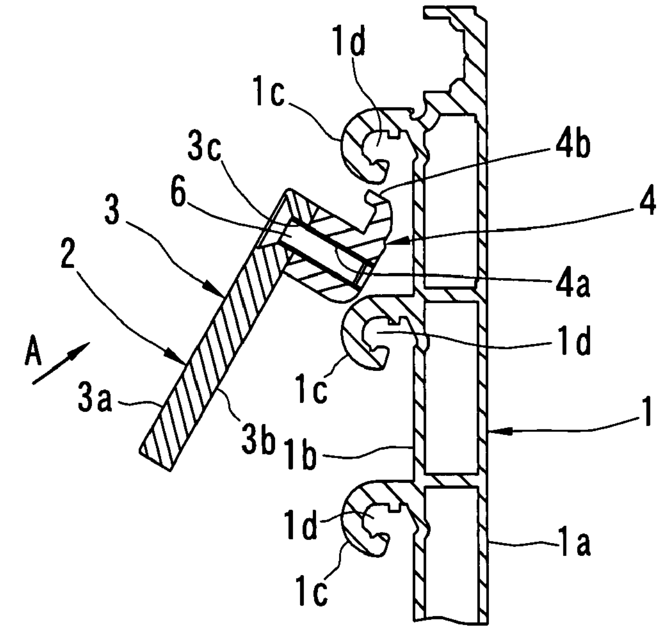
FIG. 2 is a vertical sectional side view for explaining how to attach an engagement member to a panel in the above embodiment.

FIGS. 1 and 2 show a first embodiment of the present invention. A display device A according to the first embodiment comprises a panel (base material) 1 and an engagement member 2.

The panel 1 is formed in a flat plate by an aluminum die material. Of course, the panel 1 may be formed of other plate material such as, for example, a plate material or a hollow plate material made of synthetic resin such as polyethylene, or a cosmetic plate made of wood. The panel 1 is vertically arranged and its rear surface (right surface in FIG. 1) 1*a* is fixed to a vertical wall surface (not shown). A plurality of engagement parts 1*c* extending horizontally in a left and right direction are formed on a vertical front surface 1*b* of the panel 1. The respective engagement parts 1*c* are arranged at constant intervals in a vertical direction. A tip part of each engagement part 1*c* is bent downwardly in a generally semicircular configuration. Thus, an engagement recess 1*d* whose one end on the front surface 1*b* side is open downwardly is formed between the front surface 1*b* and the engagement part 1*c* of the panel 1.

The engagement member 2 includes a main body part 3 and an engagement part 4. The main body part 4 is formed in a flat plate-like configuration from aluminum, synthetic resin, wood or the like. The left and right length and the vertical length of the main body part 3 are properly determined depending on for what purpose the engagement member 2 is to be used. The main body part 3 is provided at a front surface 3*a* thereof with a support member 5. This support member 5 is formed in a suitable configuration depending on for what purpose it is to be used. For example, in case a hunger (not shown) is hang on the support member 5 or in case the support member 5 supports one end of a horizontal rack board, the support part 5 is formed in a rod-like configuration. In case the support member 5 itself is a rack board, it is formed in a flat plate extending in the left and right direction. The support member 6 is also formed in the front surface 3*a* of the main body part 3 in the embodiments to be described hereinafter. However, the support member 6 is not shown in any drawing for those embodiments excepting the one shown in FIG. 5. A screw passage hole 3*c* is formed in an upper end of the main body part 3 in such a manner as to pass therethrough from a front surface 3*a* to a rear surface 3*b*.

The engagement part 4 is formed generally in a rectangular configuration in section from aluminum, synthetic resin, wood or the like. Normally, material of the engagement part 4 is selected from the same material as that of the main body part 3. The left and right length of the engagement member 4 is set equal to the left and right length of the main body 3 and the vertical length of the engagement part 4 is set much shorter than the vertical length of the main body part 3. The back and forth length of the engagement part 4 is set such that when the engagement member 2 is attached to the panel 1 in parallel relation, a slight gap is formed between the rear surface 3*b* of the main body part 3 and the front end of the engagement part 1*c*. The back and forth, left and right and vertical lengths of the engagement part 4 can suitably be changed. A screw hole 4*a* is formed in the engagement part 4 from the front surface to the rear surface of the engagement part 4. A screw member 6 passing through the screw passage hole 3*c* is threadingly engaged with the screw hole 4*a*. By tightening this screw member 6, the engagement part 4 is removably pressure-fixed to the rear surface 3*b* of the main body part 3. An engagement claw part 4*b* is formed on the end of the upper surface of the engagement part 4 on the side of the rear surface. This engagement claw part 4*b* is inserted into the engagement recess 1*d* through the open part at the lower end of the engagement recess 1*d* and removably engaged with the engagement part 1*c*. By bringing the engagement claw part 4*b* into engagement with the engagement part 1*c*, the engagement member 2 is removably engaged with the panel 1. Since the engagement structure between the engagement claw part 4*b* and the engagement part 1*c* is known, detailed description thereof is omitted. Of course, other known structures than the illustrated engagement structure may be employed as the engagement structure between the engagement claw part 4*b* and the engagement part 1*c*.

In order to bring the engagement claw part 4*b* into engagement with the engagement part 1*c*, the engagement member 2, as shown in FIG. 2, is properly inclined so that the lower end of the main body part 3 is more separated from the panel 3 than the upper end. Thereafter, the engagement member 2 is moved in the direction as indicated by an arrow A of FIG. 2 and the upper end of the engagement claw part 4*b* is inserted into the engagement recess 1*d* through an open part on the lower side of the engagement recess 1*d*. Then, by turning the main body part 4 toward the panel 1 about the center of the engagement claw part 4*b*, the rear surface of the engagement part 4 is abutted with the front surface 1*b* of the panel 1. By doing so, the engagement claw part 4*b* can be brought into engagement with the engagement part 1*c*. The engagement claw part 4*b* can be removed from the engagement part 1*c* in the reverse procedure. At the time for bringing the engagement claw part 4*b* into engagement with the engagement part 1*c*, it is not always necessary to preliminarily attach the engagement part 4 to the main body part 3 but the engagement part 4 may be preliminarily removed from the main body part 3. In case the engagement part 3 is preliminarily removed from the main body part 3, the engagement claw part 4*b* is brought into engagement with the engagement part 1*c* in the above-mentioned manner and only the engagement part 4 is attached to the panel 1 and then, the engagement part 4 is fixed to the main body part 3.

Figure 3:
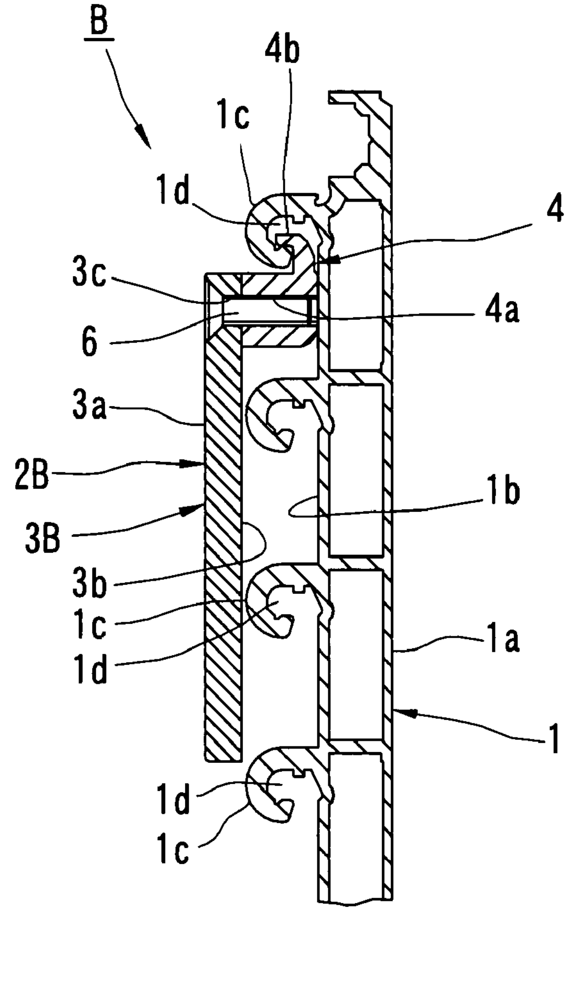
FIG. 3 is a vertical sectional side view, partly omitted, showing a second embodiment of the present invention.

When the engagement member 2 for the display device A thus constructed is to be manufactured, even if it is necessary to manufacture different kinds of main body parts 3 each having different upper and lower lengths, the engagement members 4 are not required to be manufactured as many kinds as corresponding to the main body parts 3 each having different upper and lower lengths but only one kind of engagement members 4 are good enough to be manufactured. For example, in the display device B shown in FIG. 3 according to the second embodiment of the present invention, the engagement member 2B is employed instead of the engagement member 2. The engagement member 2B is different from the engagement member 2 only in the respect that the length of the main body part 3B is longer than the length of the main body part 3 and other construction is same as the engagement member 2. That is, in the engagement member 2B, the same engagement part 4 is employed as in the engagement member 2. Therefore, when the engagement members 2, 2B are to be manufactured, only the main body parts 3, 3B may be manufactured and the same engagement part 4 may be used for the engagement members 2, 2B. Thus, the manufacturing cost of the engagement members 2, 2B can be reduced to that extent.

Figure 4:
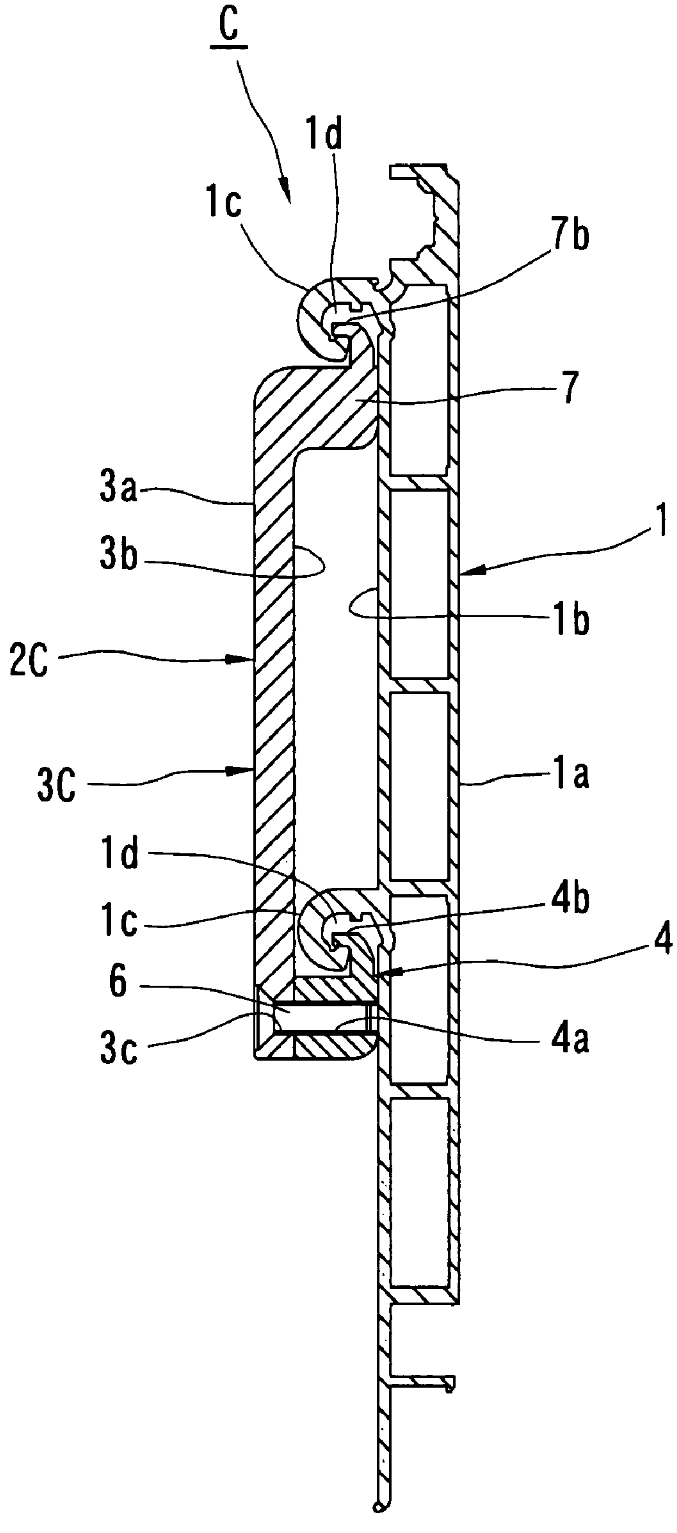
FIG. 4 is a vertical sectional side view showing a third embodiment of the present invention.

FIG. 4 shows a third embodiment of the present invention. In a display device C of the third embodiment, an engagement member 2C is employed. The engagement member 2C comprises a main body part 3C, an engagement part 4 and an integral engagement part (engagement part) 7.

The engagement part 4 is removably attached to the lower end of the rear surface 3*b* of the main body part 3C by the screw member 6. The integral engagement part 7 is same in construction as the engagement part 4 except that it has no screw hole 4*a* of the engagement part 4 and that it is integrally formed with the main body part 3C at the upper end of the rear surface 3*b* of the main body part 3C. Therefore, the integral engagement part 7 includes an engagement claw part 7*b* corresponding to the engagement claw part 4*b* of the engagement part 4.

In order to attach the engagement member 2C thus constructed to the panel 1, the engagement part 4 is brought into engagement with the engagement part 1*c* of the panel 1 and the integral engagement part 7 is brought into engagement with the engagement part 1*c* which is separated upwardly by a portion equal to the vertical length of the main body part 3C with respect to the engagement part 1*c* with which the engagement part 4 is engaged. However, the engagement part 4 and the integral engagement part 7 are unable to be brought into engagement with the two engagement parts 1*c*, 1*c* simultaneously. Therefore, at the time for attaching the engagement member 2C to the panel 1, the engagement part 4 is preliminarily removed from the main body part 3C. Then, the engagement part 4 is brought into engagement with the engagement part 1*c* and the integral engagement part 7 is brought into engagement with the engagement part 1*c*, so that the rear surface 3*b* of the main body part 3C is abutted with the engagement part 4. Thereafter, the main body part 3C and the engagement part 4 are fixed to each other by the screw member 6. The engagement member 2C can be attached to the panel 1 in the manner as just mentioned. On the contrary, in order to remove the engagement member 2C from the panel 1, the screw member 6 is removed first so that the engagement part 4 is separated from the main body part 3C. Thereafter, the engagement part 4 and the main body part 3C having the integral engagement part 7 are removed from the engagement part 1C.

Figure 5:
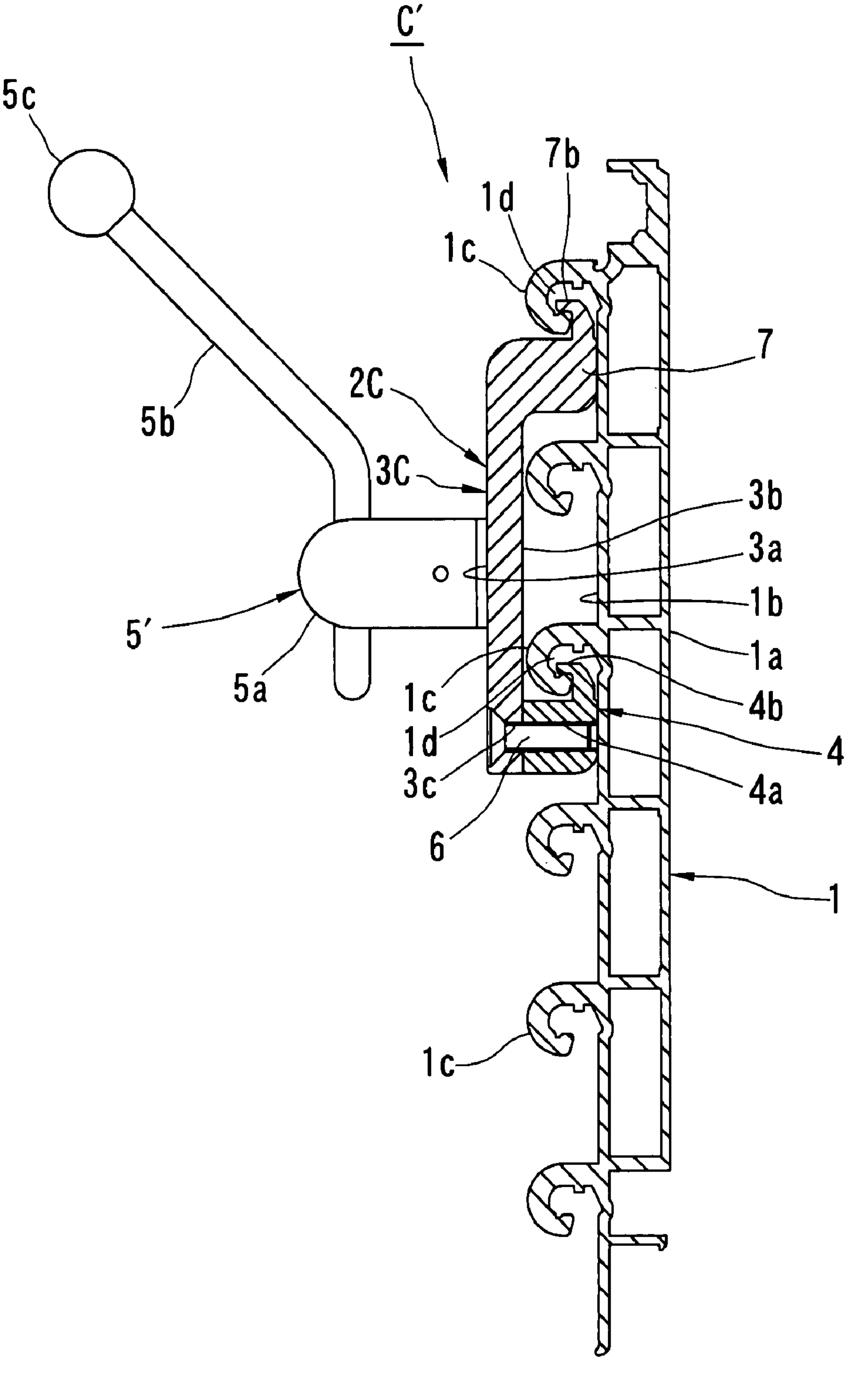
FIG. 5 is a vertical sectional side view showing a fourth embodiment of the present invention.

FIG. 5 shows a fourth embodiment of the present invention. A display device C' according to the fourth embodiment is a modification of the display device C and it employs a support member 5' instead of the support member 5. The support member 5' includes a base part 5*a* removably fixed to the front surface 3*a* of the main body part 3C and a rod 5*b* disposed at the tip part of the base part 5*a*. The rod 5*b* is bent at its vertically intermediate part, and its lower end extending vertically is turnably supported by the base part 5*a* about an axis directing vertically. Therefore, by turning the rod 5*b*, the position of the upper end of the rod 5*b* can be changed in a horizontal plane. A spherical body 5*c* is fixed to the upper end of the rod 5*b* so that a hat or the like can be hooked on this spherical body 5*c*.

Figure 6:
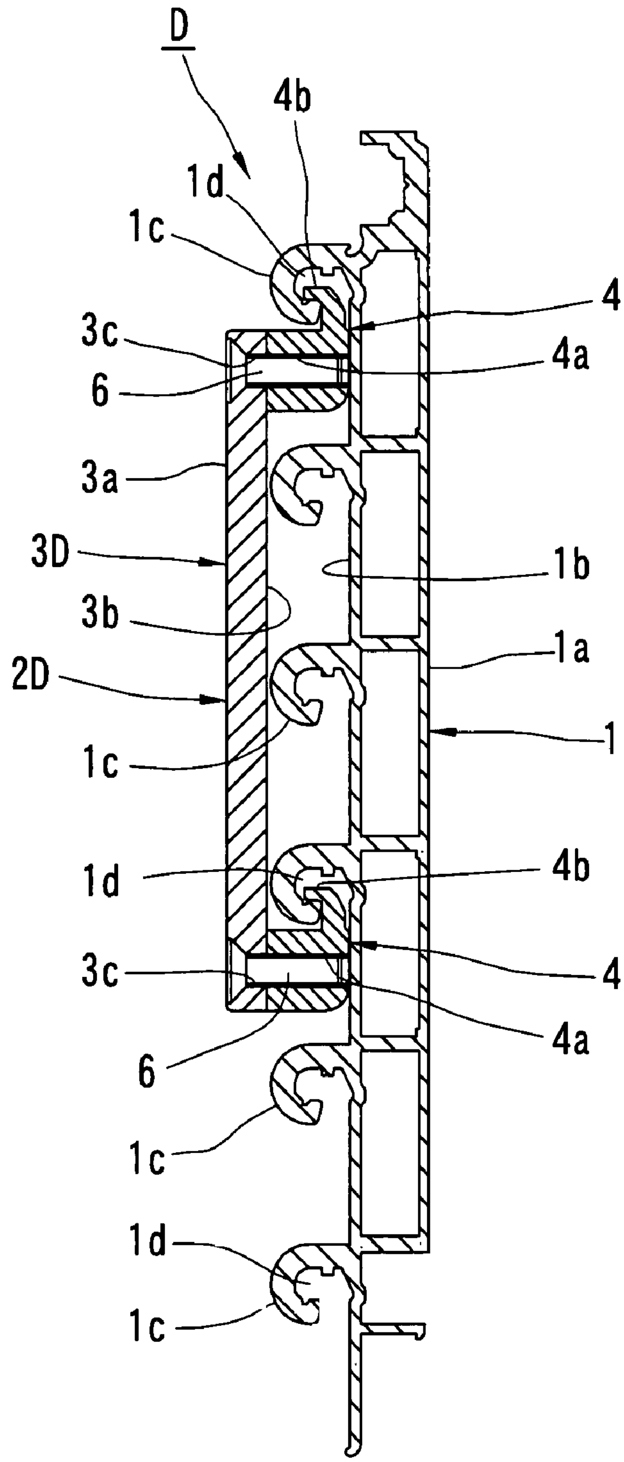
FIG. 6 is a vertical sectional side view showing a fifth embodiment of the present invention.

FIG. 6 shows a fifth embodiment of the present invention. In a display device D of the fifth embodiment, an engagement member 2D is employed. The engagement member 2D includes two engagement parts 4, 4. One 4 of the two engagement parts 4, 4 is removably attached to the upper end of the rear surface 3*b* of the main body part 3D. The other engagement part 4 is removably attached to the lower end of the rear surface 3*b* of the main body part 3D. In the display device D thus constructed, by preliminarily removing the lower engagement part 4, the engagement member 2D can be attached to and removed from the panel 1 in the same manner as with the engagement member 2C of the third embodiment.

Figure 7:
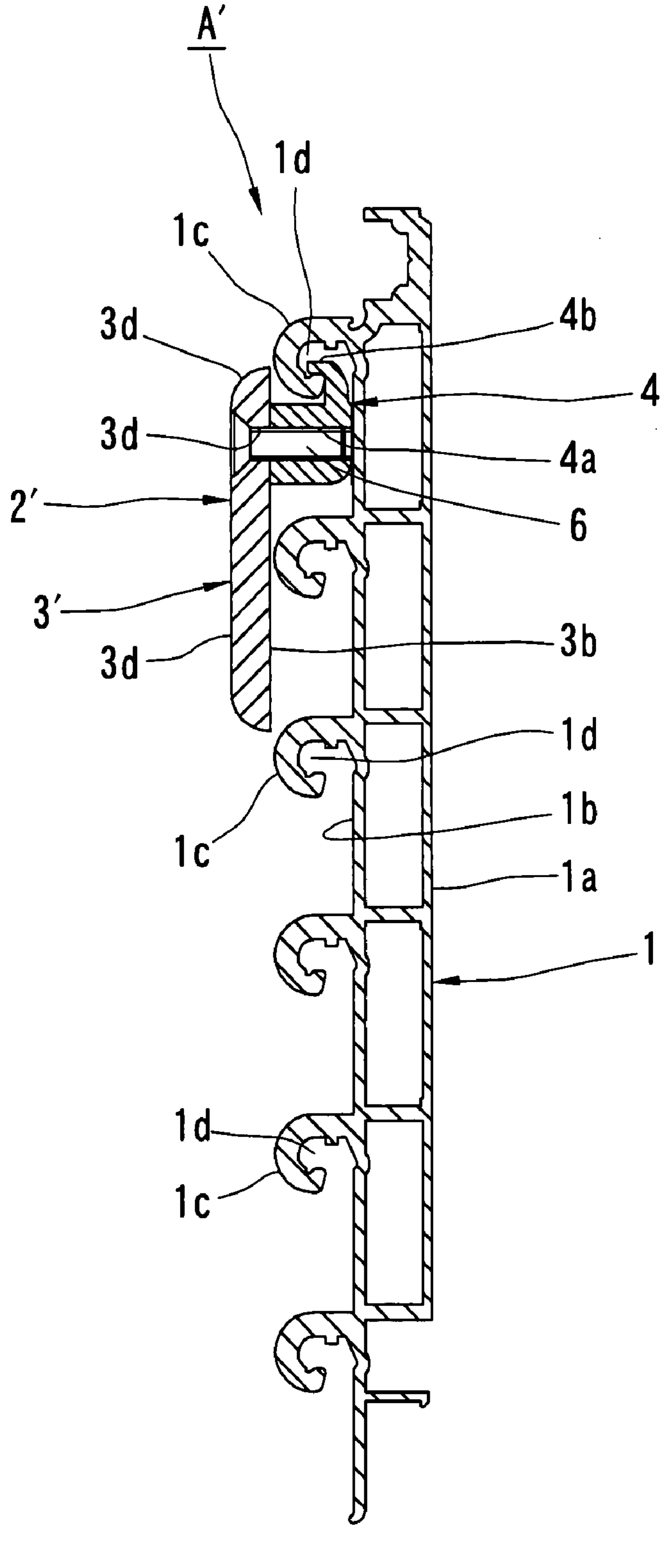
FIG. 7 is a vertical sectional side view showing a sixth embodiment of the present invention.

FIG. 7 shows a sixth embodiment of the present invention. A display device A' of the sixth embodiment is a modification of the display device A of the first embodiment. That is, in the engagement member 2 of the display device A, the upper surface of the main body part 3 is located at the same plane as the upper surface of the engagement part 4 (the same is also applicable to the embodiments shown in FIGS. 3 and 6). In contrast, in the display device A', an abutment part 3*d* protruding upwardly from the engagement part 4 is formed on the upper end of the main body part 3' of the engagement member 2'. The abutment part 3*d* is abutted with the outer surface of the engagement part 1*c* thereby the main body part 3' is prohibited from turning more than the predetermined angle before the main body part 3' is turned more than a predetermined angle to allow the engagement part 4 to be removed from the engagement part 1*c* when the main body part 3' is turned clockwise in FIG. 7 in order to remove the engagement member 2' from the panel 1. Accordingly, in the sixth embodiment, when the engagement part 4 is in a position where it is fixed to the main body part 3', the engagement member 2' cannot be removed from the panel 1. Of course, when the engagement part 4 is in a position where it is fixed to the main body part 3', the engagement member 2' cannot be attached to the panel 1, either. Therefore, when the engagement member 2' is to be attached to and removed from the panel 1, the engagement part 4 is removed from the main body part 3'.

INDUSTRIAL APPLICABILITY

The engagement member according to the present invention can be used in a display device for displaying clothes and the like.

The invention claimed is:

1. An engagement member for a display device comprising a main body part having a predetermined length in a vertical direction and an engagement part disposed at said main body part and removably engaged with a front surface part of a base material, wherein said engagement part is separately formed from said main body part and removably attached to said main body part, and an engagement claw part, which is removably engaged with said front surface part of said base material, is formed as part of said engagement part, a basal portion of said engagement claw part is elongated in the vertical direction, a distal end portion of said engagement claw part is curved in a direction perpendicular to the vertical direction, said main body part is provided with an abutment part, wherein said engagement part is prohibited from removal from said base material when said engagement part is attached to said main body part and said abutment part is abutted with said base material.

2. An engagement member for a display device comprising a main body part having a predetermined length in a vertical direction and two engagement parts mutually separately disposed at said main body part in a vertical direction and removably engaged with a front surface part of a base material, wherein at least one of said two engagement parts is separately formed from said main body part and removably attached to said main body part, and an engagement claw part, which is removably engaged with said front surface part of said base material, is formed as part of said engagement part, a basal portion of said engagement claw part is elongated in the vertical direction, a distal end portion of said engagement claw part is curved in a direction perpendicular to the vertical direction, said main body part is provided with an abutment part, wherein said engagement part is prohibited from removal from said base material when said engagement art is attached to said main body art and said abutment art is abutted with said base material.

* * * * *

UNITED STATES PATENT AND TRADEMARK OFFICE

CERTIFICATE OF CORRECTION

PATENT NO. : 7,753,333 B2 
APPLICATION NO. : 11/794062
DATED : July 13, 2010
INVENTOR(S) : Harunobu Kubota It is certified that error appears in the above-identified patent and that said Letters Patent is hereby corrected as shown below:

In Claim 2, Column 6, lines 54-55, the lines appear as "from said base material when said engagement art is attached to said main body art and said abutement art is" and should read --from said base material when said engagement part is attached to said main body part and said abutement part is--

Signed and Sealed this

Twelfth Day of October, 2010

David J. Kappos
*Director of the United States Patent and Trademark Office*